April 23, 1963   E. BRYANT, JR   3,086,609
GEAR SHIFT LEVER COVER AND ATTACHING BRACKET THEREFOR
Filed Dec. 19, 1961
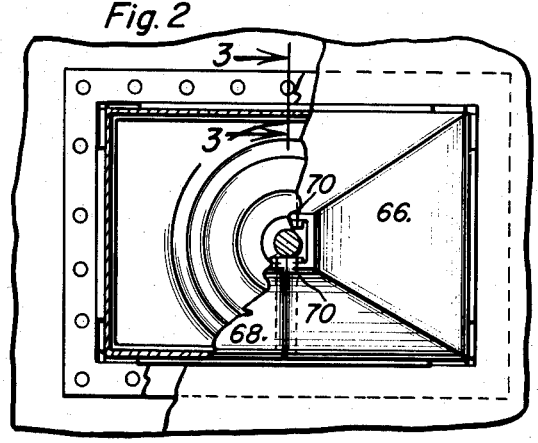
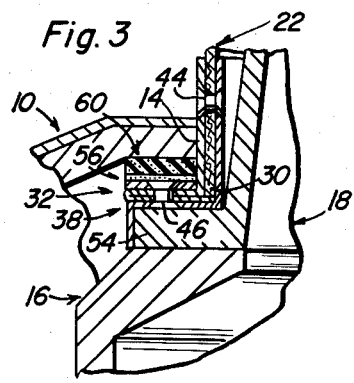
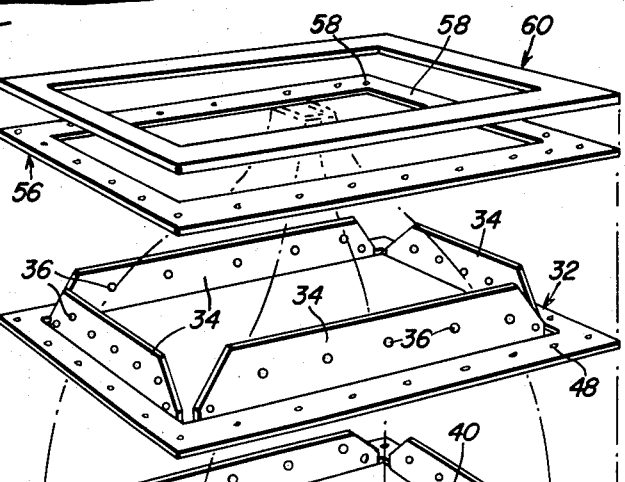
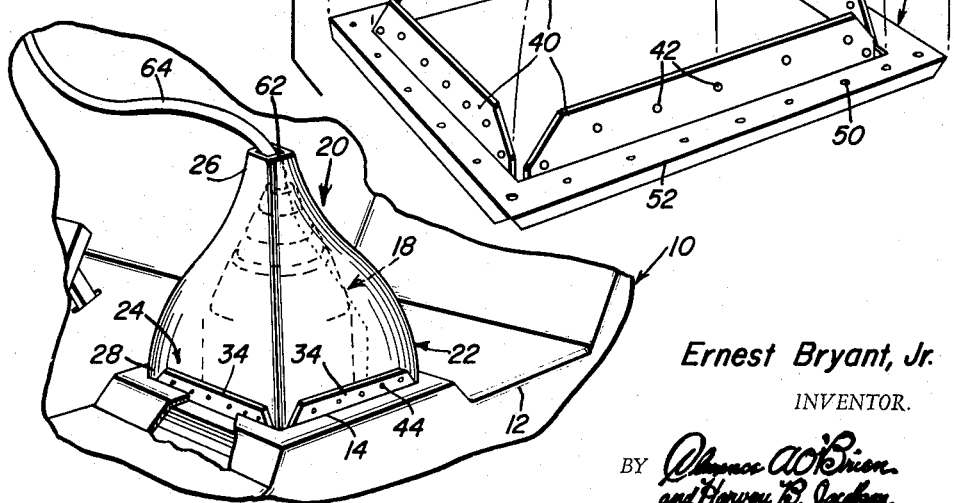
Ernest Bryant, Jr.
INVENTOR.

United States Patent Office 3,086,609
Patented Apr. 23, 1963

3,086,609
GEAR SHIFT LEVER COVER AND ATTACHING
BRACKET THEREFOR
Ernest Bryant, Jr., P.O. Box 2353, East Gadsden Station,
Gadsden, Ala.
Filed Dec. 19, 1961, Ser. No. 160,616
10 Claims. (Cl. 180—90.6)

This invention relates to a novel and useful gear shift lever cover and attaching bracket therefor which has been primarily designed for the purpose of providing a seal between the upper portion of a transmission through which a gear shift lever projects and the floorboard of a vehicle in which the transmission is disposed and between the gear shift lever cover and the floorboard of the vehicle.

Most vehicles provided with transmissions of the type including a floor gear shift lever are resiliently mounted from the vehicle frame and thus are capable of moving relative to the floorboard of the vehicle. A vehicle provided with a floor-type gear shift lever has an opening formed in its floorboard and the gear shift lever projects upwardly through the opening formed in the floorboard and into the driver compartment of a vehicle. In the past housing assemblies have been carried by the upper portion of the transmission and utilized to enclose the lower portion of the gear shift lever and to project upwardly through the opening formed in the floorboard of the vehicle. These housings have previously been provided with frame-like resilient seals for forming a seal between the gear shift lever housing and the floorboard of the vehicle through which the gear shift housing projects but these frame-like seals previously used were necessarily constructed of resilient material and thus became quickly damaged by constant wedging of the seal between the gear shift lever housing and the portions of the floorboard defining the opening through which the gear shift housing projects. A loose and sloppy fit between the gear shift lever housing and the floorboard of the vehicle not only resulted in undesirable increased road noises but also enabled engine fumes and the like to gain access to the interior of the driver's compartment of the vehicle.

It is accordingly therefore the main object of this invention to provide a gear shift lever cover assembly and an attaching bracket therefor which may be utilized to provide a long lasting and efficient seal between the transmission gear shift lever housing carried by the upper portion of a floor shift type transmission and the opening formed in the floorboards of a vehicle through which the gear shift housing projects.

A further object of this invention, in accordance with the immediately preceding object, is to provide a gear shift lever cover assembly which may be conveniently constructed of various sizes for use in different types of vehicles.

A still further object of this invention is to provide a gear shift lever cover including a resilient and flexible downwardly opening hollow housing for snugly embracing the gear shift lever housing of a transmission which projects upwardly through a vehicle floorboard and means for rigidly mounting the flexible and resilient hollow housing to the top portion of the transmission in a manner which will protect the flexible and resilient hollow housing from coming into direct contact with either the transmission or the floorboard through which the gear shift lever housing projects.

A final object to be specifically enumerated herein is to provide a gear shift lever cover assembly and attaching bracket therefor which will conform to conventional forms of manufacture, be of simple construction and easy to install so as to provide a device that will be economically feasible, long lasting and trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a fragmentary portion of a vehicle floorboard shown with the gear shift lever cover assembly of the instant invention and portions of its attaching bracket projecting upwardly through an opening formed in the floorboard and disposed about the lower end of a gear shift lever projecting upwardly through the opening formed in the floorboard;

FIGURE 2 is a plan view of the embodiment illustrated in FIGURE 1 with portions thereof being broken away and shown in section;

FIGURE 3 is an enlarged fragmentary vertical sectional view taken substantially upon the plane indicated by section line 3—3 of FIGURE 2; and FIGURE 4 is an exploded perspective view of the attaching bracket of the gear shift lever cover assembly.

Referring now more specifically to the drawings the numeral 10 generally designates a vehicle floorboard assembly which is conventional in design and provided with a center tunnel portion 12 in which there is formed an opening 14. The transmission of the vehicle of which the floorboard assembly comprises a part is generally designated by the reference numeral 16 and includes a gear shift lever mounting housing generally referred to by the reference numeral 18 which projects upwardly through the opening 14 formed in the floorboard assembly 10. The gear shift lever cover assembly is generally referred to by the reference numeral 20 and includes a downwardly opening flexible hollow housing generally referred to by the reference numeral 22 and an attaching bracket assembly generally referred to by the reference numeral 24.

It will be noted that the downwardly opening flexible hollow housing comprising a cover for the gear shift lever housing 18 includes an upper minor dimensional end portion 26 and a lower major dimensional end portion 28. The major conventional end portion 28 terminates in four substantially straight lower edge portions 30. The attaching bracket assembly 24 includes an upper open frame-like base panel generally referred to by the reference numeral 32 which includes inner marginal upstanding sides 34 which are apertured as at 36. A lower open-frame-like base panel is generally referred to by the reference numeral 38 and includes inner marginal upstanding side walls 40 which are apertured as at 42. It will be noted that corresponding ones of the apertures 36 are registerable with the apertures 42 and that when the upper base panel 32 is telescoped over the lower base panel 38 and is disposed in surface-to-surface contacting relation therewith that the sides 34 and the side wall 40 will be disposed in slightly spaced relation. The lower marginal edge portions 30 of the cover boot 22 are disposed between the sides 34 and the side walls 40 and fasteners 44 are utilized to secure corresponding ones of the sides 34 and side walls 40 together in order to compressively engage the lower marginal edge portions 30 of the boot 22 therebetween.

It will be noted that the upper base panel 32 is secured to the lower base panel 38 by means of fasteners 46 secured through the registered apertures 48 and 50 formed in the upper and lower base panels 32 and 38 respectively.

The base panel 38 includes outer marginal edge portion depending flanges 52 which snugly embrace the lower mounting flange portion 54 of the gear shift lever housing 18 and in this manner, the attaching bracket assembly 24 is secured to the transmission 16. In addition, it will be noted that an open frame-like cap generally referred to by the reference numeral 56 is provided and overlies the upper base panel 32 with the sides 34 being snugly embraced thereby. It may be observed that the cap 56 is apertured as at 58 and that the fasteners 46 also secure the cap 56 to the upper and lower base panels 32 and 38.

A resilient open frame-like cushion generally referred to by the reference numeral 60 is provided and corresponds in size and shape to the cap 56 and is disposed thereover and snugly receives the sides 34 and is thereby disposed for disposition between the upper surfaces of the cap 56 and the under surfaces of the floorboard assembly 10. In this manner, the attaching bracket assembly 24 is cushioned relative to the floorboard assembly 10. The upper end of the cover boot 22 has a small opening 62 formed therein which snugly receives the gear shift lever 64 and in this manner, dust and dirt is prevented from entering the upper end of the boot 22.

The boot 22 may be formed of a pair of halves 66 and 68 and joined together in any convenient manner such as by stitching 70, see FIGURE 2. In operation, the gear shift lever cover assembly and its attaching bracket assembly 24 are assembled and the attaching bracket assembly 24 may be engaged with the gear shift lever housing 18 as viewed in FIGURE 3 of the drawings. Then, when the transmission is installed, the boot 22 and the side and side walls 34 and 40 of the attaching bracket assembly 24 will be received upwardly through the opening 14 formed in the floorboard assembly 10. However, if the floorboard assembly 10 comprises a part of a tilt cab, installation of the gear shift lever cover assembly and attaching bracket is greatly facilitated as the cab may be tilted forwardly in order to lift up the floorboard assembly 10 whereupon the assembled gear shift lever cover assembly and attaching bracket may be slid down over the upper end of the gear shift lever 64 and disposed in engagement with the mounting flange portion 54 of the gear shift lever housing 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gear shift lever cover assembly and attaching bracket therefor to be used in providing a cover for the lower end of the portion of a gear shift lever projecting upwardly from the top wall of a floor-type vehicle transmission which projects through an opening formed in the vehicle floorboard disposed immediately above said transmission, said cover assembly comprising an upper open frame-like base panel including inner marginal upstanding sides and adapted to closely underlie said floorboard with said sides projecting upwardly through said opening, a lower open frame-like base panel including inner marginal upstanding side walls corresponding to said sides, a gear shift lever cover boot comprising a downwardly opening flexible hollow housing whose lower end is snugly received between the sides of said upper base panel and snugly receives the side walls of said lower panel, means securing said base panels together, the upper end of said housing having a small opening formed therein adapted to snugly receive said gear shift lever.

2. The combination of claim 1 including a rigid open frame-like cap disposed over said upper base panel outwardly of said sides and secured thereto.

3. The combination of claim 2 wherein said securing means also secures said cap to said upper base.

4. The combination of claim 1 including means secured between said sides and corresponding ones of said side walls compressively engaging corresponding portions of said housing therebetween.

5. The combination of claim 1 including a rigid open frame-like cap disposed over said upper base panel outwardly of said sides and secured thereto, means secured between said sides and corresponding ones of said side walls compressively engaging corresponding portions of said housing therebetween.

6. The combination of claim 5 wherein said securing means also secures said cap to said upper base.

7. The combination of claim 1 including a rigid open frame-like cap disposed over said upper base panel outwardly of said sides and secured thereto, a resilient open frame-like cushion corresponding in size and shape to said cap disposed thereover and snugly receiving said sides and adapted to be disposed between said cap and the under surface of said floorboard.

8. The combination of claim 1 wherein said lower base includes outer marginal depending flanges adapted to snugly embrace the top portion of said transmission through which said gear shift lever projects.

9. The combination of claim 1 including a rigid open frame-like cap disposed over said upper base panel outwardly of said sides and secured thereto, a resilient open frame-like cushion corresponding in size and shape to said cap disposed thereover and snugly receiving said sides and adapted to be disposed between said cap and the under surface of said floorboard, said lower base including outer marginal depending flanges adapted to snugly embrace the top portion of said transmission through which said gear shift lever projects.

10. The combination of claim 9 including means secured between said sides and corresponding ones of said side walls compressively engaging corresponding portions of said housing therebetween.

References Cited in the file of this patent
UNITED STATES PATENTS

| | | |
|---|---|---|
| 1,523,259 | Curry | Jan. 13, 1925 |
| 1,589,434 | Shoenrock | June 22, 1926 |
| 1,788,894 | Schjolin | Jan. 13, 1931 |
| 2,093,672 | Golden | Sept. 21, 1937 |